United States Patent
Golasky et al.

(10) Patent No.: US 7,162,658 B2
(45) Date of Patent: *Jan. 9, 2007

(54) SYSTEM AND METHOD FOR PROVIDING AUTOMATIC DATA RESTORATION AFTER A STORAGE DEVICE FAILURE

(75) Inventors: Richard K. Golasky, Round Rock, TX (US); William Price Dawkins, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/070,065

(22) Filed: Mar. 2, 2005

(65) Prior Publication Data

US 2005/0193238 A1 Sep. 1, 2005

Related U.S. Application Data

(63) Continuation of application No. 09/976,786, filed on Oct. 12, 2001, now Pat. No. 6,880,101.

(51) Int. Cl.
*G06F 11/00* (2006.01)

(52) U.S. Cl. ............... 714/6; 714/8; 714/4; 711/162

(58) Field of Classification Search ............... 714/4, 714/5, 6, 8; 711/162, 165, 209
See application file for complete search history.

(56) References Cited

U.S. PATENT DOCUMENTS

| | | | | |
|---|---|---|---|---|
| 6,016,553 A | 1/2000 | Schneider et al. | ............ | 714/21 |
| 6,081,875 A | 6/2000 | Clifton et al. | ............ | 711/162 |
| 6,148,414 A | 11/2000 | Brown et al. | ............ | 714/9 |
| 6,154,853 A | 11/2000 | Kedem | ............ | 714/6 |
| 6,173,376 B1 | 1/2001 | Fowler et al. | ............ | 711/162 |
| 6,199,178 B1 | 3/2001 | Schneider et al. | ............ | 714/21 |
| 6,240,527 B1 | 5/2001 | Schneider et al. | ............ | 714/21 |
| 6,243,827 B1 | 6/2001 | Renner, Jr. | ............ | 714/6 |
| 6,424,999 B1 | 7/2002 | Arnon et al. | ............ | 709/208 |
| 6,446,175 B1 | 9/2002 | West et al. | ............ | 711/162 |
| 6,609,213 B1 | 8/2003 | Nguyen et al. | ............ | 714/4 |
| 6,640,291 B1 | 10/2003 | Fujibayaski et al. | ............ | 711/162 |
| 6,671,820 B1 | 12/2003 | Kelman | ............ | 714/4 |
| 6,708,265 B1 * | 3/2004 | Black | ............ | 711/207 |
| 6,721,902 B1 | 4/2004 | Cochran | ............ | 714/6 |
| 6,880,101 B1 * | 4/2005 | Golasky et al. | ............ | 714/4 |
| 2002/0029319 A1 | 3/2002 | Robbins et al. | ............ | 711/114 |
| 2002/0103889 A1 | 8/2002 | Markson et al. | ............ | 709/223 |
| 2002/0133737 A1 | 9/2002 | Novick | ............ | 714/5 |

(Continued)

OTHER PUBLICATIONS

Microsoft Computer Dictionary, 1999, Microsoft Press, 4th Ed., pp. 377, 385.*

(Continued)

*Primary Examiner*—Robert Beausoliel
*Assistant Examiner*—Christopher McCarthy
(74) *Attorney, Agent, or Firm*—Baker Botts L.L.P.

(57) ABSTRACT

A system and method for providing automatic data restoration after a storage device failure are disclosed. An agent module detects a failure at a logical unit located at a primary storage device. The agent module locates backup data from the failed logical unit that is stored on a backup storage device and transfers the backup data from the backup storage device to a spare logical unit located on the primary storage device. The agent module then maps the spare logical unit to an address associated with a host in response to detecting the failure at the logical unit.

17 Claims, 2 Drawing Sheets

U.S. PATENT DOCUMENTS

| | | |
|---|---|---|
| 2002/0188697 A1 | 12/2002 | O'Connor .................. 709/219 |
| 2004/0025154 A1 | 2/2004 | Sedlack ..................... 717/174 |
| 2004/0025155 A1 | 2/2004 | Sedlack et al. ............ 717/174 |
| 2004/0073676 A1 | 4/2004 | Honma et al. .............. 709/226 |
| 2005/0004979 A1* | 1/2005 | Berkowitz et al. .......... 709/203 |
| 2005/0028025 A1* | 2/2005 | Zalewski et al. .............. 714/6 |
| 2005/0188166 A1* | 8/2005 | Fujibayashi et al. ........ 711/162 |
| 2005/0268056 A1* | 12/2005 | Meiri et al. ................. 711/162 |
| 2006/0005074 A1* | 1/2006 | Yanai et al. ................... 714/5 |

OTHER PUBLICATIONS

Microsoft Computer Dictionary, Microsoft Press, 4th Edition, p. 414.

* cited by examiner

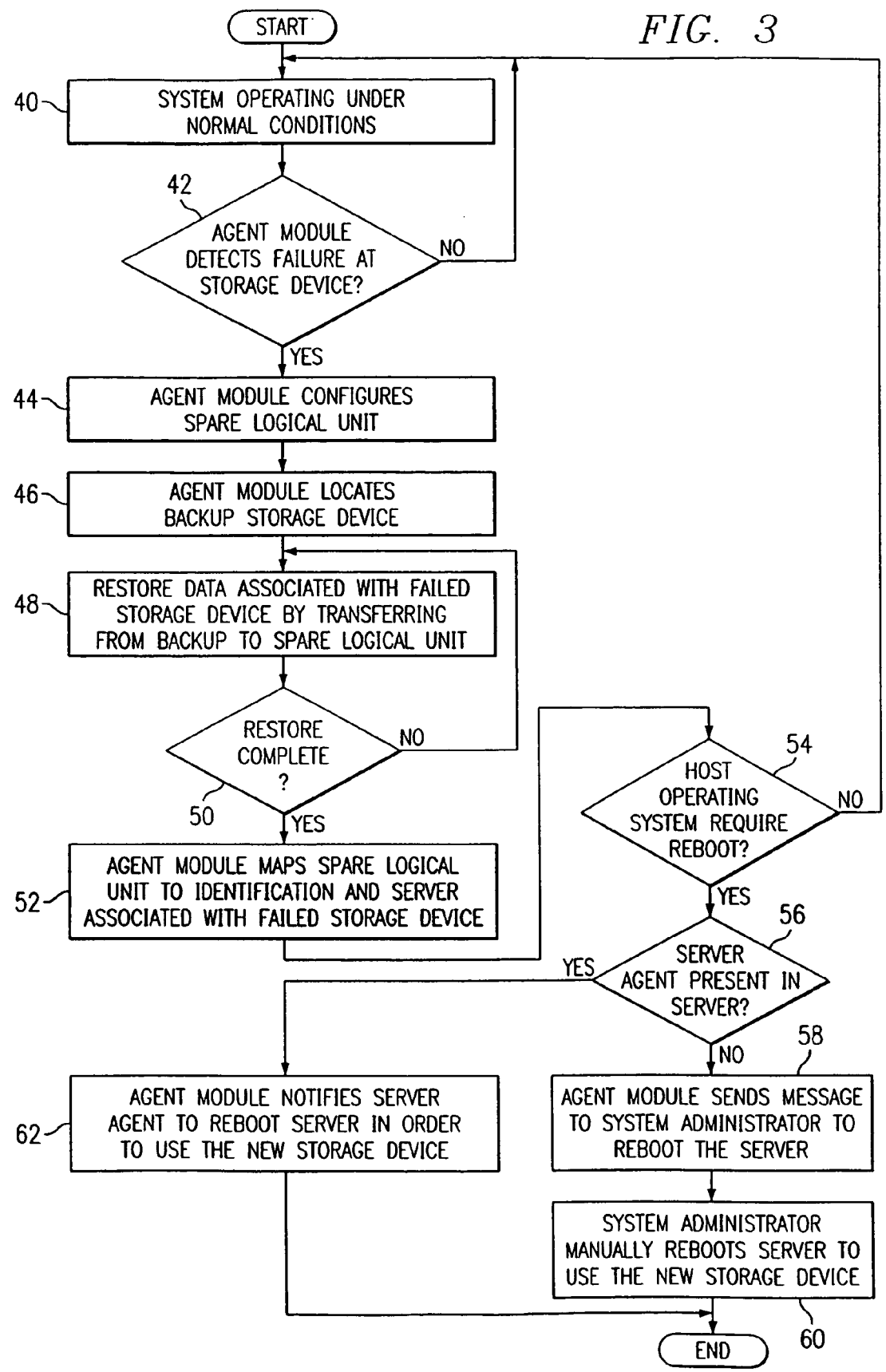

SYSTEM AND METHOD FOR PROVIDING AUTOMATIC DATA RESTORATION AFTER A STORAGE DEVICE FAILURE

RELATED PATENT APPLICATION

This application is a continuation of U.S. patent application Ser. No. 09/976,786 entitled "System and Method for Providing Automatic Data Restoration After a Storage Device Failure" filed Oct. 12, 2001 by Richard K. Golasky, now U.S. Pat. No. 6,880,101.

TECHNICAL FIELD

This invention relates in general to the field of storage systems, and more particularly to a system and method for providing automatic data restoration after a storage device failure.

BACKGROUND

The demand for data storage protection and capacity in computer networking environments increases substantially each year. Internet use and data-intensive applications, such as multimedia and online transaction processes, have contributed to the increased demand for data storage capacity. Users are also demanding faster access to the data and the ability to share pooled data among a large number of users over distributed locations. In addition to these demands, many network administrators desire the ability to efficiently change the amount of storage available on a network and provide maintenance to the existing storage.

Today, the computer industry is turning to storage area networks (SANs) to meet demands for increased storage capacity and more rapid access to data. A conventional SAN typically includes a collection of data storage devices interfaced with one or more servers or workstations. Many SANs use Fibre Channel (FC) technology in order to transmit data at higher rates. FC devices are generally based on Fibre Channel Protocol (FCP), which may support multiple protocols including Small Computer Serial Interface (SCSI), Asynchronous Transfer Mode (ATM), Transmission Control Protocol/Internet Protocol (TCP/IP), High Performance Parallel Interface (HiPPI), Intelligent Peripheral Interface (IPI) and others.

In the event that a storage device containing a server boot partition fails, a system administrator must manually bring the server back online. In order for the system administrator to restore the data from the failed storage device, the system administrator first must be notified of the failure. The system administrator must then determine which storage device failed and locate a spare storage device on the network. Finally, the system administrator must manually restore the data to the spare storage device by using the backup data from the failed storage device and assign the spare storage device to the server so that the server has access to the restored data. The process is not only time consuming for the system administrator but can waste time for users on the network since the system administrator may not be able to correct the problem immediately after the failure occurs.

To eliminate the manual restoration process, data partitions in a SAN may be mirrored. The mirroring technique requires that each host on the network store data on a primary storage device and a backup storage device. Mirroring, therefore, requires twice the number of storage devices than a SAN without mirroring. Furthermore, since the host must store data in at least two-storage devices, the speed of the network may be effected.

SUMMARY

In accordance with teachings of the present disclosure, a system and method are provided that substantially eliminate or reduce disadvantages and problems associated with data restoration after a storage device failure. In one embodiment, an agent module automatically transfers data from a backup storage device to a spare storage device in response to detecting a failure at a primary storage device assigned to a host and maps the spare storage device to the host associated with the primary storage device.

More specifically, an agent module receives notification from a redundant array of independent disks (RAID) device that a failure occurred at a logical unit assigned to the host. The agent module then instructs a backup server to transfer the backup data associated with the failed logical unit, which is located on a backup tape drive or data depository, to a spare logical unit that is configured by the agent module in response to detecting the failure. When the data transfer is complete, the agent module maps the spare logical unit to an address associated with the host that owned the failed storage device. The agent configures the spare logical unit so that the spare logical unit appears to the host as the original logical unit. If the host must be rebooted before it may access the spare logical device, the agent instructs the host to reboot. Otherwise, the host accesses the spare logical unit when the agent completes mapping the spare logical unit to an address associated with the host.

Important technical advantages of certain embodiments of the present invention include an agent module that automatically restores data when a storage device failure is detected. The agent module monitors the hosts and storage devices interfaced with a network. If the agent module detects a failure on one of the storage devices, the module identifies a spare storage device located on the network, transfers backup data associated with the failed storage device from a backup storage device to the spare storage device, and remaps the spare storage device to the host. The agent module, therefore, restores the data from the last backup of the failed storage device without any human intervention. Furthermore, since the agent module may immediately begin the restoration process, services provided by the host may only be interrupted for a very short period of time.

Another important technical advantage of certain embodiments of the present disclosure includes an agent module that eliminates the need for mirroring from applications that require the immediate restoration of data. Mirroring typically requires that at least two storage devices be assigned to a single host. In the present invention, the agent module interfaces with a backup server that has access to a backup storage device, such as a high speed tape drive. During normal operation, the backup server transfers backup data from storage devices interfaced with a network and assigned to a host onto the tape drive. When one of the network storage devices fails, the agent module instructs the backup server to transfer the data from the tape drive on to a spare, or newly configured, storage device. The agent module, therefore, reduces the need for additional storage devices and increases the speed of the overall network.

All, some, or none of these technical advantages may be present in various embodiments of the present disclosure.

Other technical advantages will be readily apparent to one skilled in the art from the following figures, descriptions, and claims.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein:

FIG. 3 illustrates a flow diagram for providing automatic data restoration after a storage device failure.

DETAILED DESCRIPTION

Figure 1:
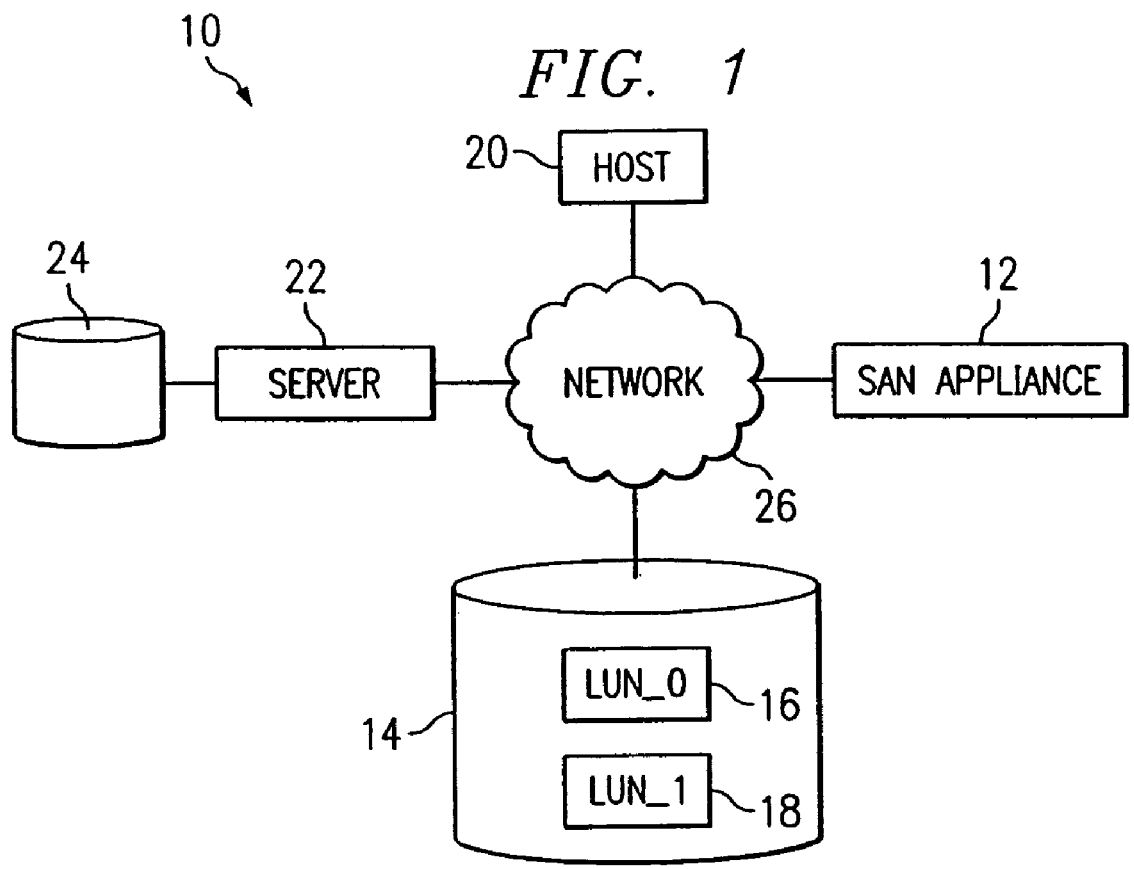
FIG. 1 illustrates a block diagram of a storage area network for providing automatic data restoration after a storage device failure according to the teachings of the present disclosure.
Figure 2:
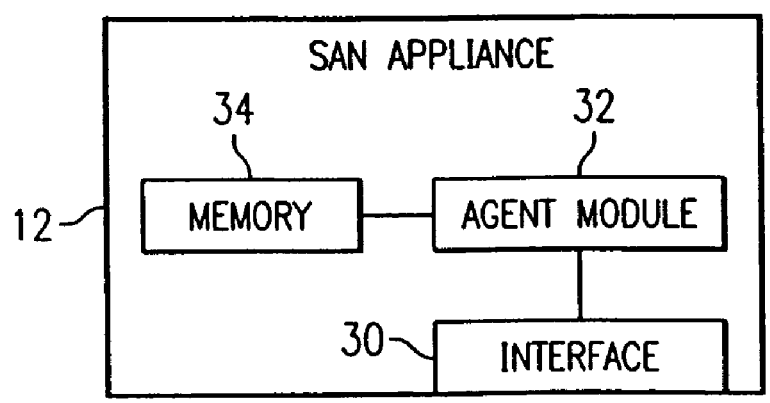
FIG. 2 illustrates a block diagram of a SAN appliance including an agent module that automatically restores data after a storage device failure.

Preferred embodiments and their advantages are best understood by reference to FIGS. 1 through 3, wherein like numbers are used to indicate like and corresponding parts.

FIG. 1 illustrates a block diagram of computer system 10 for providing automatic data restoration after a storage device failure. In the illustrated embodiment, system 10 includes SAN appliance 12, storage device 14, host 20 and server 22 interfaced with network 26. Storage device 24 may be coupled to server 22 though direct communications links, including, but not limited to, Transmission Control Protocol/Internet Protocol (TCP/IP), Ethernet, InfiniBand, parallel Small Computer System Interface (SCSI), Advanced Technology Attachment (ATA), Universal Serial Bus (USB) or Fibre Channel Protocol (FCP). In one embodiment, host 20 may be assigned to store data on logical unit 16 located on storage device 14. If a failure occurs at logical unit 16, an agent located in SAN appliance 12 detects the failure at logical unit 16, unmaps logical unit 16 from host 20, configures logical unit 18 on storage device 14, locates data associated with logical unit 16 on storage device 24, instructs server 22 to transfer backup data from storage device 24 to logical unit 18, and maps logical unit 18 to an address associated with host 20. The agent, therefore, restores data without any intervention by a system administrator.

Network 26 may be a storage area network (SAN) that includes conventional networking components compatible with Ethernet, FCP, InfiniBand and SCSI standards. In alternative embodiments, network 26 may be a local area network (LAN), wide area network (WAN), a wireless network or any other suitable network that is compatible with FCP, SCSI and additional protocols and standards. A SAN may be defined when physical storage device sharing is enabled, such as through fibre channel loops, and hubs or switches. Each device interfaced with a fibre channel network may be referred to as a node. Nodes that generate data and seek to store that data, such as workstations, servers and stand-alone personal computers (PCs), may be known as hosts or originators. Nodes that act as data storage devices, such as disk storage, tape drives, or redundant array of independent disks (RAID) devices, may be known as targets or responders.

A SAN may use different types of topologies, including, but not limited to, point-to-point, switched fabric, arbitrated loop and any other appropriate combinations of these topologies. In the point-to-point topology, nodes are connected by direct connections through a node port located in each of the devices. In the switched fabric topology, one or more electronic switching devices may be included that provide multiple, simultaneous, point-to-point connections between node pairs. In the arbitrated loop topology, devices may connect to the network via a loop port. A hub may be added in the arbitrated loop topology to connect multiple nodes to one loop and allow devices to be added or removed from the loop with minimal disruption to the network.

Fibre channel technology allows data and network protocols to coexist on the same physical media. In one embodiment, the physical media may be a twisted pair copper cable used for the public switched telephone network (PSTN). In other embodiments, the physical media may be fiber-optic cable if the distance between nodes is too large for copper cable. The FCP-SCSI command set protocol may be used to interface hosts, such as servers and workstations, with targets, such as conventional storage devices and RAID devices. FCP-SCSI commands allow storage and retrieval of data to and from the host server and the target storage device as though the storage area network is simply a SCSI device interfaced through fibre channel fabric. In alternative embodiments, network 26 may use FCP-IP, FCP-VI or any other suitable command set protocol for accessing and storing data.

System 10 includes host 20 that communicates with and transfers data to and from storage device 14 through network 26. For example, host 20 may use storage device 14 as local storage even though storage device 14 is remote from host 20. As described above, FCP supports SCSI protocols that allow host 20 to treat storage device 14 as localized storage. Host 20 may be a server, workstation, stand-alone personal computer (PC) or any other suitable computing platform that may execute various applications and store data associated with those applications at storage device 14.

Storage device 14 may be the primary storage device for hosts interfaced with network 26. Storage device 14 may be one or a collection of hard disks, RAID devices, optical or magnetic medium or any other suitable type of non-volatile storage. Storage device 14 may further be grouped into one or more volumes or logical units and each volume may be assigned a logical unit number (LUN) address. For example, in the SCSI-2 protocol, storage device 14 may be partitioned into eight different LUNs. In the SCSI-3 protocol, a sixty-four bit identifier is used to address the LUNs in storage device 14. Therefore, although storage device 14 includes logical units 16 and 18 that respectively correspond to LUN addresses LUN_0 and LUN_1, any number of LUN addresses may be assigned to storage device 14 by a vendor. Host 20 may then use the assigned LUN addresses to access storage device 14. The available physical storage of storage device 14, therefore, is mapped into a plurality of logical unit devices. Logical units 16 and 18 (generally referred to as logical units 16) may be accessed through one or more ports on storage device 14 and may provide virtual storage for network 26. Although system 10 is illustrated in FIG. 1 as including one storage device, system 10 may include multiple storage devices at distributed locations on network 26 and/or multiple physical storage devices within storage device 14.

System 10 also includes server 22 that transfers data to and from storage device 14 and storage device 24. For example, during normal operation of system 10 data may be transferred between host 20 and logical unit 16. At predetermined time intervals, such as every hour or at a specified time every day, server 22 may access storage device 14 and copy the data on logical unit 16 to storage device 24. In this way, server 22 performs a back up of the data on logical unit 16 and the backed up data may be used if there is a storage device failure in system 10. In one embodiment, storage device 24 may be a high-speed tape drive. In other embodiments, storage device 24 may be one or a collection of hard disks, RAID devices, optical or magnetic medium or any other suitable type of non-volatile storage.

System 10 further includes SAN appliance 12 that interfaces with other components, such as storage device 14, host 20 and server 22, via network 26. In one embodiment, SAN appliance 12 may be implemented as hardware and/or software executing on a computing platform, such as a stand-alone PC, a workstation or a server. In other embodiments, SAN appliance 12 may be hardware and/or software executing on other computing platforms that are part of network 26, such as host 20, a switch in network 26 or on storage device 14. The SAN appliance software or logic may be embodied in drives, diskettes, CD-ROMs, DVD-ROMs, optical or magnetic media, field programmable arrays, embedded processors or any other suitable media. In the illustrated embodiment, system 10 uses an outband configuration since SAN appliance 12 is located outside of the data stream communicated between host 20 and storage device 14. In an alternative embodiment, system 10 may use an inband configuration where SAN appliance 12 is located inside of the data stream. In this example, the data transferred between host 20 and storage device 14 passes through SAN appliance 12.

In operation, SAN appliance 12 includes an agent that monitors storage device 14 for failures on logical unit 16. When logical unit 16 is configured on storage device 14, SAN appliance 12 maps logical unit 16 to host 20 and any other hosts coupled to network 26. In one embodiment, SAN appliance 12 may assign logical unit 16 the LUN address of LUN_0 and logical unit 18 the LUN address of LUN_1. SAN appliance 12 then maps LUN_0 to host 20 by assigning the address associated with host 20 to logical unit 16. In one embodiment, the host address may be a fibre channel world wide name (WWN), which is an eight byte unique identifier. The Institute of Electronics Engineers (IEEE) assigns blocks of WWNs to manufacturers so manufacturers can build fiber channel devices with unique WWNs. In alternative embodiments, the address may be an IP address, an Ethernet address or any other suitable address that identifies the location of host 20 on network 26.

During normal operation of system 10, the agent in SAN appliance 12 monitors network 26. If the agent detects a failure at storage device 14 in logical unit 16, the agent locates a spare logical unit and configures the spare logical unit for use by host 20. In one embodiment, the agent may determine that logical unit 18 has not been assigned to any host and may be used as the spare logical unit. The agent maps logical unit 18 to server 22 and/or directly access storage device 24 to obtain the backup data associated with logical unit 16 and transfers the backup data from storage device 24 to logical unit 18. Once the transfer of data is complete, the agent maps logical unit 18 to the address associated with host 20. Host 20 may then access logical unit 18. In an alternative embodiment, host 20 may be executing an operating system that requires host 20 to reboot in order to access logical unit 18. For these operating systems, SAN appliance 12 configures the agent to remotely initiate a reboot of host 20. Once host 20 completes the reboot procedure, host 20 continues normal operation by storing and accessing data on logical unit 18. Logical unit 16 subsequently may be restored or repaired and the agent and/or SAN appliance 12 may recognize logical unit 16 as a spare logical unit.

FIG. 2 illustrates a block diagram of SAN appliance 12. SAN appliance 12 may include interface 30, agent module 32 and memory 34. Interface 30 may be a physical port, virtual port, or other suitable direct or indirect connection that allows communication with storage device 14, host 20 and server 22 over network 26. Interface 30 may also couple SAN appliance 12 to other networks, such as Internet Protocol (IP) networks, Asynchronous Transfer Mode (ATM) networks, Frame Relay networks, Fibre Channel networks and any other networks that communicate data. Agent module 32 is coupled to interface 30 and may be software executing on one or a combination of microprocessors, microcontrollers, digital signal processors (DSPs), or any other digital circuitry configured to detect a failure at storage device 14 and replace the failed logical unit with a spare logical unit. In an alternative embodiment, agent module 32 may be one of the hardware components within SAN appliance 12. Memory 34 stores data and/or instructions generated by agent module 32 and may be any suitable form of a volatile or non-volatile memory that is integral or separate from SAN appliance 12.

In operation, agent module 32 monitors network 26 and detects failures at logical units 16 on storage device 14. If storage device 14 determines that either of logical units 16 has failed, storage device 14 generates a failure message and sends the message to SAN appliance 12. The message may be a SNMP message, an Extensible Markup Language (XML) message or any other suitable message that may be generated and sent to SAN appliance 12 over network 26. SAN appliance 12 receives the message on interface 30 and communicates the message to agent module 32. Upon receiving the failure message, agent module 32 locates and configures a spare logical unit for use by host 20. In one embodiment, agent module 32 instructs storage device 14 to determine if one of logical units 16 is not assigned to a host and configure the unassigned logical unit. In another embodiment, agent module 32 may instruct storage device 14 to configure a spare logical unit that has a storage capability similar to the failed logical unit from storage media that is not being used by network 26.

After the spare logical unit is configured, agent module 32 restores data originally located on logical unit 16. During normal operation of system 10, server 22 periodically copies data located on logical unit 16 to storage device 24 so that back up copies of the data may be available to host 20. Agent module 32 instructs server 22 to restore the data by accessing storage device 24 and transferring the backup data from the last backup of the failed logical unit to a newly configured spare logical unit. In one embodiment, agent module 32 directly transfers the backup data on storage device 24 associated with the failed logical unit to the spare logical unit. In an alternative embodiment, agent module 32 may map the spare logical unit to server 22, and instruct server 22 to locate the backup data associated with the failed logical unit on storage device 24 and transfer the backup data to the spare logical unit.

When the backup data has been restored on the spare logical unit, agent module 32 maps the spare logical unit to host 20 by assigning the address associated with the failed logical unit to the spare logical unit. For example, in a SAN using fibre channel protocol, host 20 may be identified by a WWN. Agent module 32 initially maps logical unit 16 to host 20 by specifying the WWN for host 20. If a failure occurs at logical unit 16, agent module 32 restores the backup data from logical unit 16 by using logical unit 18 and maps logical unit 18 to host 20 by assigning the host WWN associated with logical unit 16 to logical unit 18. The agent configures logical unit 18 such that logical unit 18 appears to host 20 as logical unit 16.

In one embodiment, host 20 may be executing an operating system that must be rebooted before host 20 can access the restored data on logical unit 18. In this case, agent module 32 generates a message that instructs host 20 to reboot. In one embodiment, host 20 includes a host agent that may receive an instruction to automatically reboot host 20 so that host 20 may begin to use the spare logical unit to store and access data. The host agent may also send a notification to a system administrator located at an administration terminal that host 20 rebooted due to a failure at logical unit 16. In another embodiment, agent module 32 sends notification to the system administrator indicating that a failure occurred at storage device and that host 20 should be rebooted. In this example, the system administrator manually reboots host 20 to create a link between the spare logical unit at storage device 14 and host 20.

FIG. 3 illustrates a flow diagram for providing automatic data restoration after a storage device failure. Generally, agent module 32 located in SAN appliance 12 detects when a logical unit, such as logical unit 16, that is located on storage device 14 and assigned to host 20 has failed. In response to detecting the failure, agent module 32 configures a spare logical unit, such as logical unit 18, transfers backup data located on storage device 24 and associated with the failed logical unit to the spare logical unit and maps the spare logical unit to host 20 by using a host address assigned to the failed logical unit. In a particular embodiment, agent module 32 restores normal operation of system 10 by rebooting host 20 to create a logical link between host 20 and the spare logical unit.

At step 40, system 10 is operating under normal conditions. Under normal conditions, host 20 accesses logical unit 16 at storage device 14 to store and retrieve data used by host 20 to execute a variety of applications. During this time, server 22 accesses storage device 14 to periodically transfer the data from logical unit 16 to storage device 24.

At step 42, agent module 32 monitors storage device 14 for failures that may occur at logical units 16. If agent module 32 does not detect any failures, system 10 continues normal operations at step 40. If agent module 32 detects a failure at a logical unit being used by host 20, agent module 32 configures a spare logical unit at step 44. For example, host 20 may be assigned to use logical unit 16 from storage device 14. Agent module 32 may receive a message from storage device 14 that a failure has occurred at logical unit 16. The message may be sent to SAN appliance 12 using SNMP, XML or any other protocol that allows communication to occur in a distributed environment. In one embodiment, agent module 32 requests a spare logical unit from storage device 14. In this case, the spare logical unit is configured (e.g., logical unit 18) and storage device 14 gives agent module 32 access to the configured logical unit. In an alternative embodiment, the spare logical unit may not be configured and storage device 14 may create one. In this example, storage device 14 creates the spare logical unit from disks, tape drives, optical or magnetic media or other storage media not in use to meet the size requirements indicated by agent module 32. In a further embodiment, logical unit 18 may be configured on a storage device separate from storage device 14.

At step 46, agent module 32 locates server 22 and/or storage device 24. In one embodiment, agent module 32 requests server 22 to provide the location of the data copied or backed up from logical unit 16 so that agent module 32 may directly transfer the backup data to the spare logical unit (e.g., logical unit 18). In another embodiment, agent module 32 may not have the capability to directly transfer data and may map logical unit 18 to server 22. At step 48, the backup data associated with logical unit 16 is transferred from storage device 24 to logical unit 18. In one embodiment, agent module 32 may directly transfer the backup data by obtaining the location of the backup data on storage device 24 from server 22. In an alternative embodiment, server 22 may perform the data transfer. In this example, agent module 32 maps logical unit 18 to server 22 by specifying an address associated with logical unit 18 and instructs server 22 to transfer the backup data obtained from logical unit 16 and located on storage device 24 to logical unit 18.

At step 50, agent module 32 determines if the backup data restoration is complete. If the restoration is not complete, agent module 32 continues to transfer backup data from storage device 24 to logical unit 18 at step 48. If the data restoration is complete, agent module 32 maps logical unit 18 to host 20 and a host address assigned to logical unit 16 at step 52. In one embodiment, the address may be an eight byte WWN. In alternative embodiments, the address may be an IP address, an Ethernet address or any other suitable address that identifies the location of host 20 on network 26.

After logical unit 18 is mapped to host 20, agent module 32 creates a logical link between host 20 and logical unit 18. At step 54, agent module 32 determines if the operating system being executed on host 20 requires a reboot to access the data on logical unit 18. If the operating system does not require a reboot, host 20 has access to the data on logical unit 18 and system 10 returns to normal operation with host storing data on and retrieving data from logical unit 18 at step 40.

If the operating system requires a reboot, agent module 32 determines if host 20 includes a host agent that may automatically reboot host 20 at step 56. If agent module 32 does not detect the host agent, agent module 32 sends a message to a system administrator to reboot host 20 at step 58. The message may be an SNMP alert, email message or any other suitable message that may be displayed on a stand-alone PC, workstation or any other device operable to display information from network 26. At step 60, the system administrator manually reboots host 20. After the reboot is complete, system 10 returns to normal operation at step 40. If agent module 32 detects the host agent on host 20, agent module 32 instructs the host agent to reboot host 20 at step 62. After host 20 is rebooted, a logical link is established between host 20 and logical unit 18 and system 10 returns to normal operation.

Although the disclosed embodiments have been described in detail, it should be understood that various changes, substitutions and alterations can be made to the embodiments without departing from their spirit and scope.

What is claimed is:

1. A computer readable medium tangibly embodying a program of instructions, said program of instructions comprising:
    instructions to detect a failure of a first logical unit, the first logical unit coupled to a network and operable to store data associated with a networked host;
    instructions to configure a second logical unit to logically replace the first logical unit, the second logical unit coupled to the network;
    instructions to locate, using a backup server, backup data for the first logical unit;

instructions to transfer a backup copy of the data from the backup server to the second logical unit; and instructions to reboot the networked host.

2. The computer readable medium of claim 1, wherein the network comprises a storage area network (SAN).

3. The computer readable medium of claim 1, wherein the first logical unit comprises a redundant array of independent disks (RAID) device.

4. The computer readable medium of claim 1, wherein the instructions to detect the failure further comprises at least one instruction to receive notification of the failure of a storage device associated with the first logical unit.

5. The computer readable medium of claim 1, wherein the at least one instruction to transfer a backup copy further comprises at least one instruction to request the backup server to transfer the backup copy from a backup storage device to the second logical unit.

6. A system comprising:

an application server coupled to a network;

a backup server coupled to the network;

a plurality of storage devices coupled to the network, respective ones of the plurality of storage devices operable to store data associated with the application server and the backup server; and a computer readable medium tangibly embodying a program of instructions, the program of instructions comprising:

at least one instruction to detect a failure of a first logical unit associated with one of the plurality of storage devices;

at least one instruction to configure a second logical unit associated with one of the plurality of storage devices to logically replace the failed logical unit;

at least one instruction to locate, using a backup server, backup data for the first logical unit;

at least one instruction to initiate transfer of a backup copy of the data from the backup server to the second logical unit; and at least one instruction to reboot the networked host.

7. The system of claim 6, wherein the network comprises a storage area network (SAN).

8. The system of claim 6, wherein the first logical unit comprises a redundant array of independent disks (RAID) device.

9. The system of claim 6, wherein the at least one instruction to detect the failure further comprises at least one instruction to receive notification of the failure from one of the plurality of storage devices associated with the first logical unit.

10. The system of claim 6, wherein the at least one instruction to initiate a transfer of a backup copy further comprises at least one instruction to request the backup server to transfer the backup copy from a backup storage device to the second logical unit.

11. The system of claim 6, wherein at least one of the plurality of storage devices associated with the backup server comprises a tape drive.

12. A method comprising:

detecting a failure of a first logical unit, wherein the first logical unit couples to a network and operably stores data associated with a networked host;

configuring a second logical unit to logically replace the first logical unit, wherein the second logical unit couples to the network;

locating a backup copy of the data for the first logical unit, wherein the backup copy is stored in a backup storage device accessible through a backup server;

transferring the backup copy from the backup storage device to the second logical unit; and rebooting the networked host.

13. The method of claim 12, wherein the network comprises a storage area network (SAN).

14. The method of claim 12, wherein the first logical unit comprises a redundant array of independent disks (RAID) device.

15. The method of claim 12, wherein the detecting the failure further comprises receiving notification of the failure from a storage device associated with the first logical unit.

16. The method of claim 12, wherein the transferring the backup copy further comprises requesting the backup server to transfer the backup copy from a backup storage device to the second logical unit.

17. The method of claim 12, wherein the backup storage device comprises a tape drive.

* * * * *